United States Patent
Tokunaga

(10) Patent No.: US 9,360,747 B2
(45) Date of Patent: Jun. 7, 2016

(54) TRANSMISSION TYPE SCREEN

(71) Applicant: MITSUBISHI PAPER MILLS LIMITED, Tokyo (JP)

(72) Inventor: Yukio Tokunaga, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 0 days.

(21) Appl. No.: 14/382,269

(22) PCT Filed: Feb. 25, 2013

(86) PCT No.: PCT/JP2013/054705
§ 371 (c)(1),
(2) Date: Aug. 29, 2014

(87) PCT Pub. No.: WO2013/129290
PCT Pub. Date: Sep. 6, 2013

(65) Prior Publication Data
US 2015/0153639 A1  Jun. 4, 2015

(30) Foreign Application Priority Data

Mar. 2, 2012 (JP) ................................. 2012-046170
Mar. 16, 2012 (JP) ................................. 2012-060802
Mar. 30, 2012 (JP) ................................. 2012-079594

(51) Int. Cl.
*G03B 21/62* (2014.01)
*G02B 5/02* (2006.01)

(52) U.S. Cl.
CPC .............. *G03B 21/62* (2013.01); *G02B 5/0242* (2013.01); *G02B 5/0247* (2013.01); *G02B 5/0278* (2013.01)

(58) Field of Classification Search
CPC .... G02B 21/62; G02B 5/0242; G02B 5/0247; G02B 5/0278
USPC ................................................. 359/452, 460
See application file for complete search history.

(56) References Cited

U.S. PATENT DOCUMENTS 2,661,438 A * 12/1953 Shand ........................... 313/116
6,039,390 A * 3/2000 Agrawal et al. ............... 296/211
(Continued)

FOREIGN PATENT DOCUMENTS

CN          102356334 A       2/2012
GB           1129925 A  * 10/1968  ............. G03B 21/62
(Continued)

OTHER PUBLICATIONS

Office Action dated Oct. 2, 2015 for Japanese Application No. 2012-046170 with English Translation.
(Continued)

*Primary Examiner* — Christopher Mahoney
(74) *Attorney, Agent, or Firm* — Birch, Stewart, Kolasch & Birch, LLP

(57) ABSTRACT

This is to provide a transmission type screen where a viewing angle at which an image projected by a projector can be visually recognized is extremely wide, and image visibility from the both surfaces of the screen is excellent.
The present invention relates to a transmission type screen comprising a light transmissive support and a light diffusion layer on at least one surface of the light transmissive support, wherein the light diffusion layer contains light diffusion fine particles and a xerogel. It preferably relates to the above-mentioned transmission type screen wherein the xerogel contains inorganic fine particles and a resin binder, and the inorganic fine particles are particles dispersed in an aggregated form having an average primary particle diameter of 18 nm or less and an average secondary particle diameter of 500 nm or less.

13 Claims, 5 Drawing Sheets

(56) References Cited

U.S. PATENT DOCUMENTS

| | | | |
|---|---|---|---|
| 2001/0005282 A1 | 6/2001 | Etori et al. | |
| 2002/0192139 A1* | 12/2002 | Sievers et al. | 423/338 |
| 2004/0253427 A1* | 12/2004 | Yokogawa et al. | 428/212 |
| 2006/0040204 A1 | 2/2006 | Nagahama et al. | |
| 2006/0152651 A1* | 7/2006 | Negley et al. | G02F 1/133606 349/64 |
| 2006/0290253 A1* | 12/2006 | Yeo et al. | 313/116 |
| 2007/0190291 A1 | 8/2007 | Kitahara et al. | |
| 2009/0040772 A1* | 2/2009 | Laney | 362/353 |
| 2009/0268299 A1* | 10/2009 | Furui et al. | 359/601 |
| 2011/0317099 A1 | 12/2011 | Fuchida et al. | |
| 2012/0237673 A1* | 9/2012 | Kuniyasu et al. | 427/162 |
| 2013/0242395 A1* | 9/2013 | Nishimura et al. | 359/599 |
| 2015/0077966 A1* | 3/2015 | Bessho et al. | 362/19 |

FOREIGN PATENT DOCUMENTS

| | | |
|---|---|---|
| JP | 0 599 272 A1 | 6/1994 |
| JP | 06-165095 A | 6/1994 |
| JP | 2001-242546 A | 9/2001 |
| JP | 2005-024942 A | 1/2005 |
| JP | 2006-119318 A | 5/2006 |
| JP | 2006-259028 A | 9/2006 |
| JP | 2007-034324 A | 2/2007 |
| JP | 2007-249185 A | 9/2007 |
| JP | 2010-211854 A | 9/2010 |
| JP | 2011-126274 A | 6/2011 |
| JP | 2012-012092 A | 11/2012 |
| JP | 2012-212092 A | 11/2012 |
| TW | 201116893 A | 5/2011 |
| WO | WO 99/50710 A1 | 10/1999 |
| WO | WO 2010/143552 A1 | 12/2010 |

OTHER PUBLICATIONS

Office Action dated Oct. 2, 2015 for Japanese Application No. 2012-060802 with English Translation.

Office Action dated Oct. 2, 2015 for Japanese Application No. 2012-079594 with English Translation.

* cited by examiner

PRIOR ART

TRANSMISSION TYPE SCREEN

TECHNICAL FIELD

The present invention relates to a transmission type screen for projecting an image projected from a projector and visually recognizing the same.

BACKGROUND ART

At present, the so-called rear projection type transmission type screen in which an image projected from a projector is projected on a screen and it is visually recognized from an opposite side of the projector from the screen is now spreading in place of the past advertising media such as a poster, a sign, a signboard, etc. In recent years, a transmission type screen has been extremely attracted attention as a digital signage since it requires no replacement, is capable of changing the content of the image immediately, and can project digital contents including not only a static image but also dynamic image contents with a large size.

Above all, show windows, etc., of a store are, in many cases, faced to a road on which customers pass. If the show window surface can be used as a digital signage which is used as a large sized screen, it is extremely useful as advertising media. Therefore, needs of a transmission type screen which is laminated on a show window, that is, the so-called window display are increasing.

As a rear projection type transmission type screen, those using a polarizing film, a Fresnel lens sheet, a lenticular lens sheet, etc., (for example, Patent Document 1), and a screen in which light transmissive beads are adhered on a light transmissive support (for example, Patent Document 2) have been proposed. Also, a transmission type screen in which a light diffusion layer containing porous particles is provided on a light transmissive support (for example, Patent Document 3), and a transmission type screen comprising a light diffusion layer which contains light diffusion fine particles and a resin binder and provided on a light transmissive support, wherein a part of the light diffusion fine particles is protruded from the light diffusion layer whereby making the haze value 80% or more, the total light transmittance 60% or more, and the specular glossiness of at least one of the surfaces 10% or less (for example, Patent Document 4) have been proposed.

Further, if a show window, etc., of a store can not only be used its window surface as a digital signage depending on necessity, but also have an inherent function of allowing visual recognition of the goods in the store through the window, it is extremely useful as advertising media. Therefore, needs of a transmission type screen which can be seen through and is laminated on a show window are also increasing.

In transmission type screens disclosed in Patent Documents 1, 2, 3 and 4, etc., the screen itself is opaque, and it is impossible to use these as a see-through transmission type screen. As the see-through transmission type screen, a transmission type screen (for example, Patent Documents 5 and 6) which comprises a light scattering layer containing a transparent resin binder and spherical fine particles having an average particle diameter of 1.0 to 10 μm and a relative refractive index n thereof to a refractive index of the transparent resin binder of $0.91<n<1.09$ (provided that $n \neq 1$) provided on a light transmissive support has been proposed.

PRIOR ART DOCUMENTS

Patent Documents

Patent Document 1: JP H06-165095A
Patent Document 2: WO 99/050710A
Patent Document 3: JP 2006-119318A
Patent Document 4: JP 2005-024942A
Patent Document 5: JP 2001-242546A
Patent Document 6: JP 2007-034324A

DISCLOSURE OF THE INVENTION

Problems to be Solved by the Invention

In the transmission type screen for window display, to demonstrate the function to its maximum as an advertisement, high image visibility where an image projected by a projector can be visually recognized from wide angles has been required. Also, there is a chance to visually recognize an image not only from outside the window on which a screen has been laminated (an opposite side of the projector from the screen), but also from inside of the store (a projector side), so that an excellent transmission type screen has been desired on the image visibility from both surfaces of the screen. Further, when the screen is provided not only for the window display, but also in a space of the store, excellent image visibility from the both surfaces of the screen has been similarly required. However, in the conventional transmission type screen, its viewing angle at which an image projected by a projector can be visually recognized is narrow, and cannot be satisfactory. Moreover, the quality of image visibility from the projector side is also not sufficiently satisfactory. Also, when it is used as a see-through transmission type screen, it is difficult to satisfy both of transparency and image visibility sufficiently.

Also, in the transmission type screen for window display, a large sized image projected from a projector has been required to be reproduced without unevenness and with high luminance at any position. Also, in the transmission type screen in general, when an image is projected parallel to the perpendicular line of the screen, if the image is observed from the position where a lens of the projector, the image of the screen and the observing position are on a straight line, there occurs a hot spot phenomenon which is a phenomenon that light from the projector lens can be seen to the viewer directly whereby the image on the screen is difficulty seen in some cases. When a projector having higher luminance characteristics is used for heightening screen luminance, the image is difficulty viewed by the hot spot phenomenon, so that an improvement has been earnestly desired. However, the conventional transmission type screen is not satisfactory in the points of luminance and luminance unevenness of an image projected by a projector, and further hot spot phenomenon.

Thus, an object of the present invention is to provide a transmission type screen having an extremely wide viewing angle at which an image projected by a projector can be visually recognized, the screen being excellent in image visibility from both surfaces of the screen. Also, another object is to provide a see-through transmission type screen excellent in transparency and image visibility. A further object is to provide a transmission type screen having high luminance of an image projected by a projector, and improved in luminance unevenness and hot spot phenomenon.

Means to Solve the Problems

Solution of the above-mentioned problems can be basically accomplished by a transmission type screen comprising a light transmissive support and a light diffusion layer provided at least one surface of the light transmissive support, wherein the light diffusion layer contains light diffusion fine particles and a xerogel.

Here, it is preferred that the xerogel contains inorganic fine particles and a resin binder, the inorganic fine particles are particles dispersed in an aggregated form, and have an average primary particle diameter of 18 nm or less and an average secondary particle diameter of 500 nm or less. The inorganic fine particles are preferably at least one selected from amorphous synthetic silica, alumina and alumina hydrate.

The light diffusion fine particles are preferably fine particles dispersed in a single particle form, and have an average primary particle diameter of 0.2 to 20.0 µm. Here, the average primary particle diameter of the light diffusion fine particles is more preferably 2.75 µm or less. The fine particles dispersed in a single particle form are preferably organic fine particles whose shape of the primary particle is spherical.

The light diffusion fine particles are preferably fine particles dispersed in an aggregated form and have an average secondary particle diameter of 1.0 to 20.0 µm. The average secondary particle diameter of the light diffusion fine particles is more preferably 3.5 to 15.0 µm. The fine particles dispersed in an aggregated form are preferably amorphous synthetic silica.

The light diffusion layer preferably contains fine particles dispersed in a single particle form and fine particles dispersed in an aggregated form as the light diffusion fine particles, the fine particles dispersed in a single particle form have an average primary particle diameter of 2.75 µm or less, the fine particles dispersed in an aggregated form have an average secondary particle diameter of 3.5 to 15.0 µm, and a shape of the secondary particle is an unspecified shape. The average secondary particle diameter of the fine particles dispersed in an aggregated form is more preferably 5.0 to 9.0 µm. It is preferred that the fine particles dispersed in a single particle form are organic fine particles, and the fine particles dispersed in an aggregated form are inorganic fine particles.

A refractive index of the light diffusion fine particles is preferably greater than 1.55.

Effects of the Invention

According to the present invention, a transmission type screen having an extremely wide viewing angle at which an image projected from a projector can be visually recognized, the screen being excellent in image visibility from both surfaces of the screen can be provided. Also, a see-through transmission type screen excellent in transparency and image visibility can be provided. Further, a transmission type screen in which luminance of an image projected by a projector is high, and luminance unevenness and hot spot phenomenon are improved can be provided.

EMBODIMENTS TO CARRY OUT THE INVENTION

In the following, the present invention is explained in detail.

The transmission type screen of the present invention comprises a light transmissive support, and a light diffusion layer on at least one surface of the light transmissive support, and the light diffusion layer contains light diffusion fine particles and a xerogel. The "transmission type screen" in the present invention means a screen through which light transmits, specifically refers to a screen in which the total light transmittance stipulated by JIS-K7105 exceeds 50%.

An index of the transparency of a light transmissive sheet-like material such as a transmission type screen, etc., has been stipulated by a haze value mentioned below by JIS-K7105. The haze value means when the value is high, then opacity is high, and when the value is low, then transparency is high.

$H = (Td/Tt) \times 100$

H: Haze value (%)
Td: Diffusion light transmittance
Tt: Total light transmittance When the transmission type screen of the present invention is used for the uses which do not require transparency, the haze value of the transmission type screen is preferably 79% or more. On the other hand, when the transmission type screen of the present invention is used for the uses which require transparency, the haze value of the transmission type screen is preferably 60% or less, more preferably 50% or less.

Incidentally, in the case of the transmission type screen having an adhesive layer mentioned later, a separate substrate is preferably laminated on the adhesive layer for the purpose of maintaining adhesiveness until mounting on a window, etc., or a protect substrate is preferably laminated on a light diffusion layer for the purpose of preventing the light diffusion layer from damaged at the time of mounting operation, etc. in some cases. The diffusion light transmittance, the total light transmittance and the haze value of the transmission type screen of the present invention are the values at the state where the separate substrate or the protect substrate is removed. This is because when the transmission type screen is mounted, it is mounted in the state that the separate substrate or the protect substrate is removed.

Figure 1:
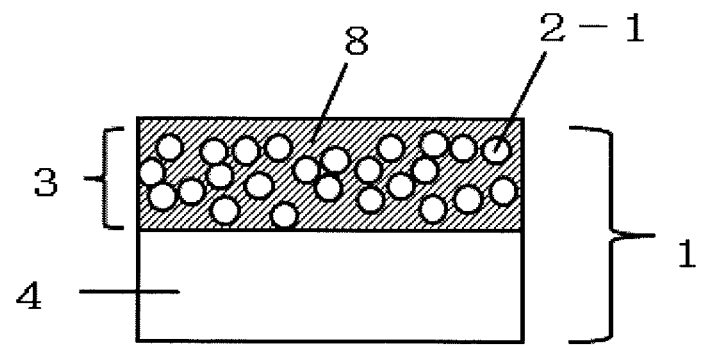
FIG. 1 is a schematic sectional view showing one example of a transmission type screen of the present invention.
Figure 2:
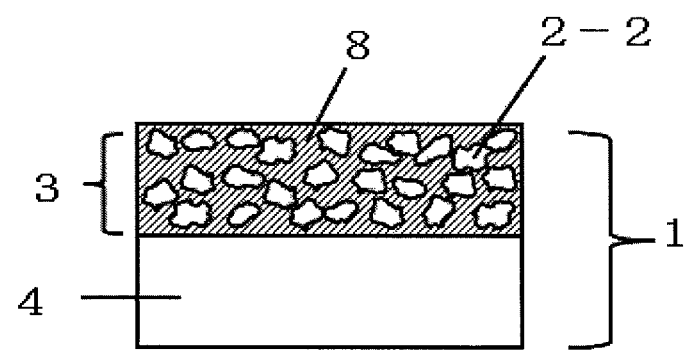
FIG. 2 is a schematic sectional view showing another example of a transmission type screen of the present invention.
Figure 3:
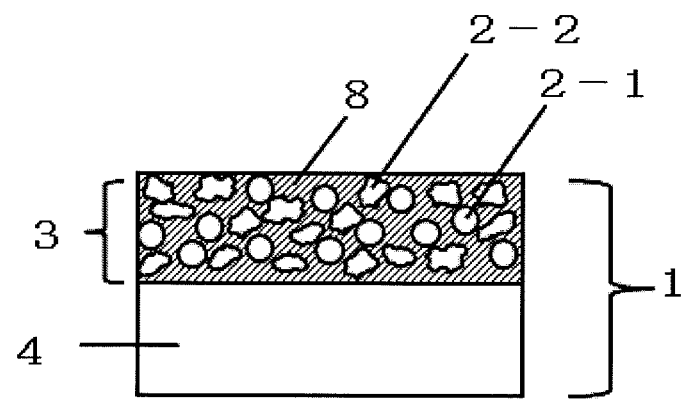
FIG. 3 is a schematic sectional view showing another example of a transmission type screen of the present invention.
Figure 4:
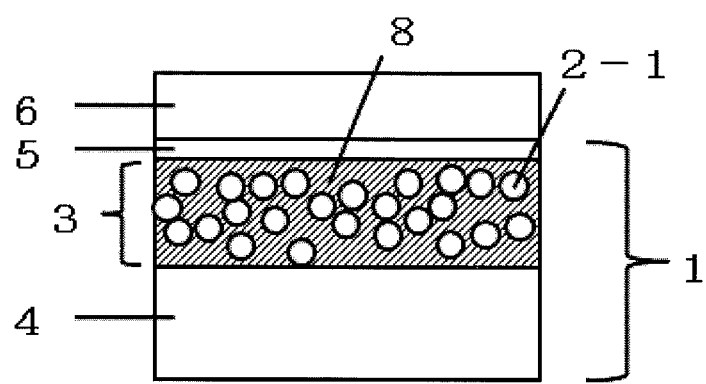
FIG. 4 is a schematic sectional view showing another example of a transmission type screen of the present invention.
Figure 5:
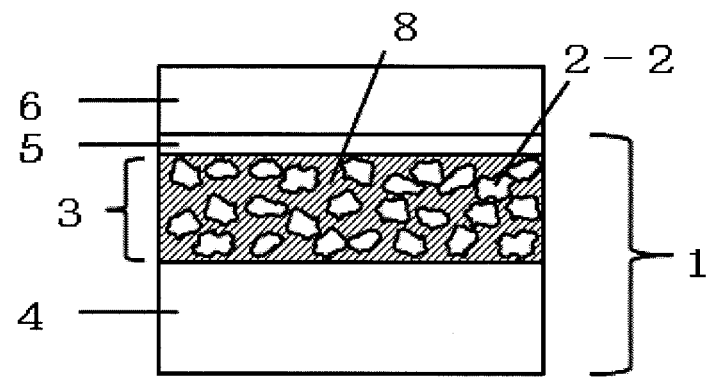
FIG. 5 is a schematic sectional view showing another example of a transmission type screen of the present invention.
Figure 6:
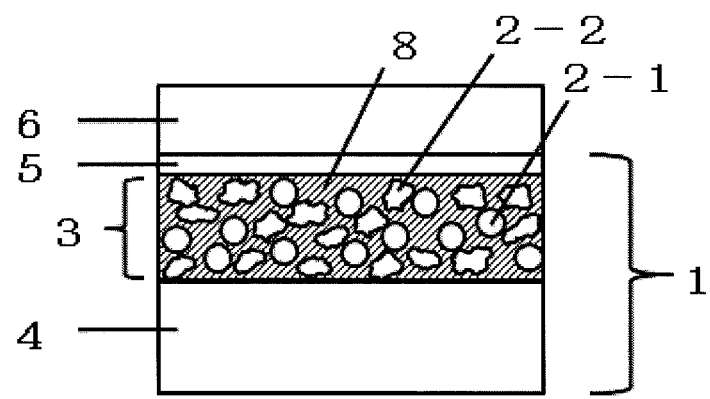
FIG. 6 is a schematic sectional view showing another example of a transmission type screen of the present invention.
Figure 7:
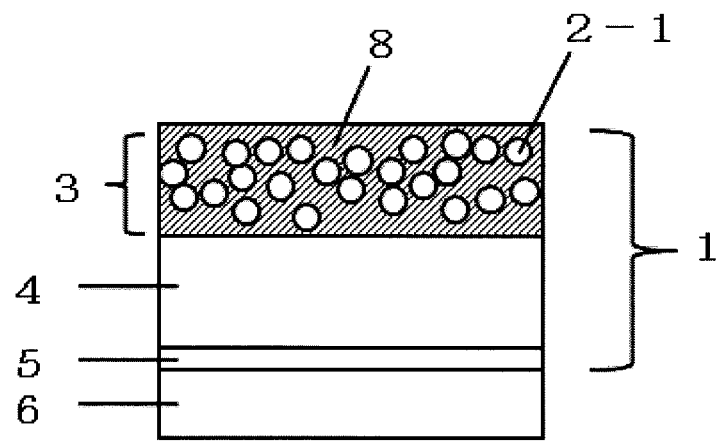
FIG. 7 is a schematic sectional view showing another example of a transmission type screen of the present invention.
Figure 8:
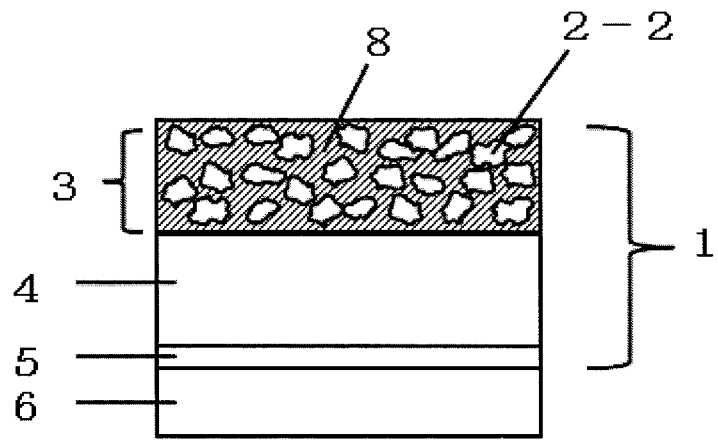
FIG. 8 is a schematic sectional view showing another example of a transmission type screen of the present invention.
Figure 9:
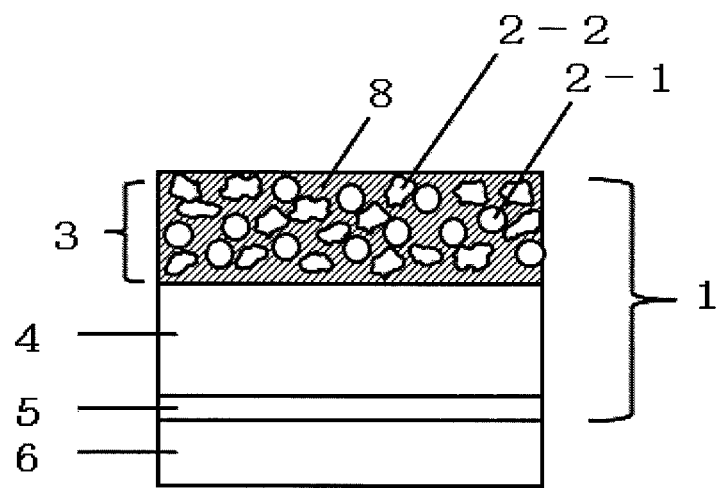
FIG. 9 is a schematic sectional view showing another example of a transmission type screen of the present invention.
Figure 10:
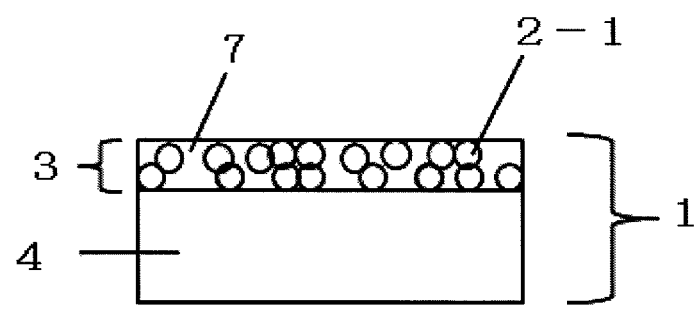
FIG. 10 is a schematic sectional view showing an example of a conventional transmission type screen.

In FIGS. 1-9, schematic sectional views of one example or other examples of the transmission type screens of the present invention are shown. In FIG. 10, a schematic sectional view of the conventional example of the transmission type screen is shown. The transmission type screen in the present invention does not have a light diffusion layer 3 in which light diffusion fine particles 2-1 and 2-2 are covered by a resin binder component 7 as shown in FIG. 10, but has a light diffusion layer 3 in which light diffusion fine particles 2 are carried on a xerogel 8 as shown in FIGS. 1-9. Incidentally, the transmission type screen of the present invention may have a constitution in which a light diffusion layer 3 alone is provided on a light transmissive support 4 as shown in FIGS. 1-3, an adhesive layer 5 is provided on a surface of a light diffusion layer 3 which surface is an opposite side of the surface onto which a light transmissive support 4 is contacted as shown in FIGS. 4-6, or an adhesive layer 5 is provided on a surface of a light transmissive support 4 which surface is an opposite side of the surface onto which a light diffusion layer 3 is contacted as shown in FIGS. 7-9. Also, while it is not shown in the drawing, in the transmission type screen of FIGS. 1-3, it is also possible to further provide a light diffusion layer of the present invention on the side of the light transmissive support 4 on which the light diffusion layer 3 is not provided. Incidentally, a separate substrate 6 is preferably provided on the adhesive layer 5 for the purpose of protecting the adhesive layer and maintaining adhesiveness until it is mounted on a substrate to be adhered.

In general, when light diffusion fine particles are attached to the light transmissive support as the light diffusion layer, a resin binder is necessary to bind the light diffusion fine particles, so that the light diffusion fine particles are in the state that they are carried in the resin binder (=a state in which the light diffusion fine particles are covered by the resin binder) on the light transmissive support. The resin binder such as an organic polymer compound or the light diffusion fine particles such as organic fine particles and inorganic fine particles, have a refractive index of generally around 1.50. In the light diffusion layer having such a constitution, a relative refractive index of the light diffusion fine particles to the resin binder is generally in $0.91 < n < 1.09$ (provided that $n \neq 1$) as in the above-mentioned Patent Documents 5 and 6 in many cases, whereby efficient light diffusion difficulty occurs. In the above-mentioned Patent Documents 3 and 4, etc., a light diffusion layer in which light diffusion fine particles are carried in a resin binder having such a structure has been disclosed. The light diffusion layers as disclosed in these Patent Documents 3 to 6, etc., are essentially different from the light diffusion layer of the present invention in which the light diffusion fine particles are carried in the xerogel.

As the light diffusion fine particles contained in the light diffusion layer of the present invention, any fine particles may be used irrespective of whether they are organic fine particles or inorganic fine particles so long as they have a light diffusing performance. As preferred light diffusion fine particles, fine particles may be used in which primary particles do not aggregate to each other, no secondary particles is formed (in the following, they are referred to as light diffusion fine particles dispersed in a single particle form), and an average primary particle diameter of which is 0.2 to 20.0 μm. In this case, an average primary particle diameter of the light diffusion fine particles is more preferably 8.5 μm or less, and further preferably 2.75 μm or less. When the light diffusion fine particles having an average primary particle diameter of 2.75 μm or less are used, especially excellent transparency can be obtained. An upper limit of the average primary particle diameter of the light diffusion fine particles dispersed in a single particle form is preferably 200 μm.

Also, as the preferred light diffusion fine particles, fine particles in which primary particles aggregate to form secondary particles (in the following, they are referred to as light diffusion fine particles dispersed in an aggregated form), and which have an average secondary particle diameter of 1.0 to 20.0 μm, may be used. The average secondary particle diameter of the light diffusion fine particles is more preferably 3.5 to 15.0 μm. An upper limit of the average secondary particle diameter of the light diffusion fine particles dispersed in an aggregated form is preferably 200 μm. As such fine particles dispersed in an aggregated form, for example, amorphous silica may be used.

When such light diffusion fine particles dispersed in a single form and/or light diffusion fine particles dispersed in an aggregated form are used, a viewing angle at which an image projected by a projector can be visually recognized is extremely wide, and image visibility from both surfaces of the screen is heightened so that it is preferred. Incidentally, the average primary particle diameter referred to in the present invention can be measured by observation using an electron microscope (for example, according to electron microscope observation of fine particles, the diameter of a circle equal to the projected area of the respective 100 primary particles existing in a fixed area is obtained as the particle diameter and an average particle diameter is obtained therefrom), and in the case of the light diffusion fine particles dispersed in a single particle form, it can be also measured as a number median diameter by using a laser scattering particle size analyzer (for example, LA910 manufactured by HORIBA Ltd.). The average secondary particle diameter of the light diffusion fine particles dispersed in an aggregated form can be measured as a number median diameter by using a laser scattering particle size analyzer (for example, LA910 manufactured by HORIBA Ltd.).

When the transmission type screen of the present invention is used for the uses which require transparency, organic fine particles dispersed in a single particle form is preferably used as the light diffusion fine particles, a shape of the primary particle is preferably spherical, and more preferably perfectly spherical. In this case, an average primary particle diameter of the light diffusion fine particles is preferably 20.0 μm or less, more preferably 8.5 μm or less, further preferably 2.75 μm or less. When the light diffusion fine particles having an average primary particle diameter of 2.75 μm or less is used, especially excellent transparency can be obtained.

Light diffusibility of the light diffusion layer is also affected by a specific surface area of the light diffusion fine particles. The specific surface area is dependent on an average primary particle diameter of the light diffusion fine particles. In the case of the fine particles dispersed in a single particle form, the specific surface area can be easily calculated from the average primary particle diameter and the specific gravity. In the case of the light diffusion fine particles dispersed in an aggregated form, the specific surface area can be measured by using the BET method which is a Brunauer, Emmett and Teller equation. Incidentally, the BET method mentioned in the present invention is one of a method for measuring surface area of a powder material by a gas phase adsorption method and is a method of obtaining a total surface area possessed by 1 g of a sample, i.e., a specific surface area, from an adsorption isotherm. In general, a nitrogen gas has frequently been used as an adsorption gas, and a method of measuring an adsorption amount obtained by the change in pressure or a volume of a gas to be adsorbed has most frequently been used. An adsorption amount is obtained based on the BET equation, and an area occupied by the surface of one adsorbed molecule is multiplied to obtain a specific surface area.

Also, a refractive index of the light diffusion fine particles is preferably 1.30 or more, more preferably 1.40 or more, and when it exceeds 1.55, it is further preferred since a viewing angle is especially wide, and a transmission type screen excellent in image visibility from the both surfaces of the screen can be obtained.

A coating amount of the light diffusion fine particles contained in the light diffusion layer of the present invention may vary depending on the use of the transmission type screen. When the transmission type screen of the present invention is used for the uses which do not require transparency, a coating amount of the light diffusion fine particles is preferably 0.1 to 20.0 g/m$^2$, more preferably 0.3 to 15.0 g/m$^2$ whereas it may vary depending on the relative refractive index of the light diffusion fine particles to the air or the specific surface area thereof. When the transmission type screen of the present invention is used for the uses which require transparency, a coating amount of the light diffusion fine particles is preferably 0.005 to 5.0 g/m$^2$, more preferably 0.01 to 3.0 g/m$^2$, further preferably 0.03 to 2.0 g/m$^2$ whereas it may vary depending on the relative refractive index of the light diffusion fine particles to the air or the specific surface area thereof. By adjusting the coating amount of the light diffusion fine particles, the haze value of the transmission type screen can be easily set.

The light diffusion fine particles may be organic fine particles or inorganic fine particles.

The material of the organic fine particles may be selected from the conventionally known materials widely, for example, acrylic polymer, styrene-acrylic copolymer, vinyl acetate-acrylic copolymer, vinyl acetate polymer, ethylene-vinyl acetate copolymer, chlorinated polyolefin polymer, multi-component copolymer such as ethylene-vinyl acetate-acryl, SBR, NBR, MBR, carboxylated SBR, carboxylated NBR, carboxylated MBR, polyvinyl chloride, polyvinylidene chloride, polyester, polyolefin, polyurethane, polymethacrylate, polytetrafluoroethylene, polymethyl methacrylate, polycarbonate, polyvinyl acetal resin, rosin ester resin, episulfide resin, epoxy resin, silicone resin, silicone-acrylic resin, melamine resin, etc. Also, as the organic fine particles in the present invention, a material in which a surface of fine particles such as melamine resin or acrylic resin, etc., is coated by inorganic fine particles such as silica, may be used. Incidentally, when composite particles comprising such organic fine particles and a small amount of inorganic fine particles (a material in which a proportion of the inorganic fine particles is lower than 50% by mass) are used, etc., they are regarded as substantially organic fine particles and can be used. Those which a sulfur atom is introduced into the monomers of these polymers for the purpose of heightening a refractive index may be used. Also, those which a fluorine substituent is introduced into the monomers of these polymers for the purpose of improving weather resistance or lowering a refractive index may be used.

The material of the inorganic fine particles may be selected from the conventionally known materials widely such as silica, alumina, rutile type titanium dioxide, anatase type titanium dioxide, zinc oxide, zinc sulfide, white lead, antimony oxides, zinc antimonate, lead titanate, potassium titanate, zirconium oxide, cerium oxide, hafnium oxide, tantalum pentoxide, niobium pentoxide, yttrium oxide, chromium oxide, tin oxide, molybdenum oxide, ATO, ITO, or an oxidized glass such as silicate glass, phosphate glass, borate glass, etc., and a composite oxide or a composite sulfide thereof, etc., may be also widely used. Also, in the case of the inorganic fine particles having a photocatalyst activity such as titanium oxide and zinc oxide, those in which extremely thin coating by silica, alumina, boron, etc., on the surface of the inorganic fine particles is carried out may be used. Also, when composite particles comprising the inorganic fine particles and a small amount of the organic fine particles (a material in which a proportion of the organic fine particles is lower than 50% by mass) are used, etc., they are regarded as substantially inorganic fine particles and can be used.

Among these inorganic fine particles, silica is preferred, and amorphous synthetic silica is more preferred. The amorphous synthetic silica can be roughly classified depending on its production processes into wet process silica, fumed silica, and others. The wet process silica can be further classified into a precipitated silica, a gel method silica and a sol process silica according to the production processes. The precipitated silica can be prepared by reacting sodium silicate and sulfuric acid under alkali conditions. Silica particles grown in grain size are aggregated and precipitated, and then, they are processed through filtration, washing by water, drying, pulverization and classification to obtain a product. As the precipitated silica, it is commercially available, for example, from Toso Silica Corporation as Nipsil, and K.K. Tokuyama as Tokusil (Registered trademark). The gel method silica can be produced by reacting sodium silicate and sulfuric acid under acidic conditions. Fine particles are dissolved during maturing and reprecipitated so that other primary particles are bound to each other. Thus, clear primary particles disappear and relatively hard aggregated particles having inner void structure are formed. For example, it is commercially available from Toso Silica Corporation as Nipgel, Grace Japan Co., Ltd. as SYLOID (Registered trademark) and SYLOJET (Registered trademark). The sol process silica is also called as colloidal silica and can be obtained by heating and maturing silica sol obtained by metathesis of sodium silicate by an acid, etc., or passing through an ion-exchange resin layer, and is commercially available, for example, from Nissan Chemical Industries, Ltd. as SNOWTEX (Registered trademark).

Fumed silica is also called as the drying process silica as compared to the wet process one, and it can be generally prepared by a flame hydrolysis method. More specifically, it has generally been known a method in which silicon tetrachloride is burned with hydrogen and oxygen, and silanes such as methyl trichlorosilane or trichlorosilane, etc., may be used in place of silicon tetrachloride singly or in combination with silicon tetrachloride. The fumed silica is commercially available from Nippon Aerosil K.K. as Aerosil (Registered trademark), and K.K. Tokuyama as QS type.

Among these amorphous synthetic silica, when the gel method silica is used, the hot spot phenomenon can be more improved, and additionally, a phenomenon that the light diffusingly transmitted though the screen tinted yellow color can be improved, and white balance close to neutral white can be obtained so that it is more preferred. An average secondary particle diameter of the gel method silica is preferably 3 to 20 μm, more preferably 4.5 to 15 μm.

In the present invention, the organic fine particles and the inorganic fine particles to be used as the light diffusion fine particles may be used each singly or a plural number of the kinds in admixture, and it is also possible to use both of the organic fine particles and the inorganic fine particles by mixing. It is also possible to use both of the light diffusion fine particles dispersed in a single particle form and the light diffusion fine particles dispersed in an aggregated form by mixing.

When the light diffusion fine particles dispersed in a single particle form and the light diffusion fine particles dispersed in an aggregated form are used by mixing, if the light diffusion fine particles dispersed in a single particle form having an average primary particle diameter of 2.75 μm or less and the light diffusion fine particles dispersed in an aggregated form having an average secondary particle diameter of 3.5 to 15.0 μm and an unspecified shape of the secondary particle (in the following, it is referred to as unspecified shape light diffusion fine particles) are used by mixing, it is preferred since luminance unevenness or hot spot phenomenon is more improved. The unspecified shape in the present invention means that, throughout the entire particles, specific shape such as spherical, rod-shape, plate-shape, etc., is not found. An average secondary particle diameter of the unspecified shape light diffusion fine particles is more preferably 5.0 to 9.0 μm. A specific surface area of the unspecified shape light diffusion fine particles is preferably 100 m$^2$/g or more, more preferably 200 m$^2$/g or more, further preferably 300 m$^2$/g or more. Also, it is preferred that the light diffusion fine particles dispersed in a single particle form are organic fine particles, and the unspecified shape light diffusion fine particles are inorganic fine particles. Examples of inorganic fine particles preferably used include amorphous synthetic silica prepared by the wet process such as precipitated silica and gel method silica.

When the light diffusion fine particles dispersed in a single particle and the unspecified shape light diffusion fine particles are used in combination in the light diffusion layer of the present invention, a coating amount of the light diffusion fine particles dispersed in a single particle form is preferably 0.1 to 15.0 g/m$^2$, more preferably 0.3 to 10.0 g/m$^2$. A coating amount of the unspecified shape light diffusion fine particles is preferably 1.0 to 20.0 g/m$^2$, more preferably 2.0 to 15.0 g/m$^2$.

Also, the light diffusion fine particles dispersed in a single particle form and the unspecified shape light diffusion fine particles may be used each one kind, or a plural number of the kinds in combination. Also, light diffusion fine particles dispersed in a single particle form having an average primary particle diameter exceeding 2.75 μm and the unspecified shape light diffusion fine particles having an average secondary particle diameter out of the range of 3.5 to 15.0 μm may be used by mixing them, and in such a case, a total amount of the light diffusion fine particles dispersed in a single particle form having an average primary particle diameter of 2.75 μm or less and the unspecified shape light diffusion fine particles having an average secondary particle diameter of 3.5 to 15.0 μm occupying the whole light diffusion fine particles contained in the light diffusion layer is preferably 50% by mass or more, more preferably 70% by mass or more, further preferably 90% by mass or more.

Next, the xerogel contained in the light diffusion layer of the present invention is explained. The light diffusion layer of the present invention carries the light diffusion fine particles by the xerogel.

The xerogel referred to in the present invention means a gel having a network structure which has voids formed by losing a solvent in the gel by evaporation, etc., the gel being an immobilized sol that is a dispersed colloid solution. A porosity of the light diffusion layer of the present invention in which the light diffusion fine particles are carried by the xerogel is preferably 40% or more, more preferably 50% or more, further preferably 60% or more.

The porosity is defined by the following formula. Here, the void volume V can be obtained as a numerical value per a unit area (square meter) by multiplying a cumulated pore volume (ml/g) of a pore radius of from 3 nm to 400 nm in the light diffusion layer obtained by measuring with use of a mercury porosimeter (for example, Autopore II 9220 manufactured by Micromeritics Instrument Corporation) and data processing, by an amount of the dried solid content (g/square meter) of the light diffusion layer. Also, the thickness of coated layer T can be obtained by photographing the cross section of the light diffusion layer by an electron microscope and measuring the length thereof.

$$P = (V/T) \times 100$$

P: Porosity (%)
V: Void volume (ml/m$^2$)
T: Thickness of coated layer (μm)

The xerogel of the present invention preferably contains inorganic fine particles and a resin binder. Also, the inorganic fine particles contained in the xerogel of the present invention preferably has an average primary particle diameter of 18 nm or less, and are preferably the fine particles dispersed in an aggregated form having an average secondary particle diameter of 500 nm or less. Such inorganic fine particles become a dispersed colloid in the light diffusion layer coating liquid using a medium mainly comprising water mentioned later, so that a xerogel can be easily formed. Incidentally, the average primary particle diameter of the inorganic fine particles can be measured by observation using a transmission type electron microscope similarly to the case of the light diffusion fine particles, and the average secondary particle diameter can be measured as a number median diameter by using a laser scattering particle size analyzer (for example, LA910 manufactured by HORIBA Ltd.) similarly to the case of the light diffusion fine particles.

The xerogel containing the inorganic fine particles and the resin binder can be obtained, for example, by removing a solvent from a dispersion liquid containing inorganic fine particles and a resin binder. The xerogel of the present invention is preferably a material obtained by removing a solvent from a light diffusion layer coating liquid containing inorganic fine particles dispersed in an aggregated form having an average primary particle diameter of 18 nm or less and an average secondary particle diameter of 500 nm or less, and a resin binder. The inorganic fine particles dispersed in an aggregated form having an average primary particle diameter of 18 nm or less and an average secondary particle diameter of 500 nm or less become a dispersed colloid in the light diffusion layer coating liquid, so that a xerogel can be easily formed by removing the solvent. Incidentally, the inorganic fine particles dispersed in an aggregated form having an average primary particle diameter of 18 nm or less and an average secondary particle diameter of 500 nm or less exist while maintaining the particle diameter after forming the xerogel as well, so that the particle diameter of the inorganic fine particles as the starting material can be regarded as the particle diameter contained by the xerogel.

Examples of inorganic fine particles contained by the xerogel of the present invention include the conventionally known various kinds of fine particles such as amorphous synthetic silica, alumina, alumina hydrate, calcium carbonate, magnesium carbonate, titanium dioxide, and amorphous synthetic silica, alumina or alumina hydrate is preferred in the point that high porosity can be obtained.

Among the amorphous synthetic silica, fumed silica can be preferably used. The fumed silica used in the present invention preferably has an average primary particle diameter of 18 nm or less, and more preferably has an average primary particle diameter of 3 to 16 nm and the specific surface area by the BET method of 100 m$^2$/g or more.

Fumed silica is preferably used by dispersing in a dispersing medium in the presence of a dispersing agent such as a cationic compound and a water-soluble polyvalent metal compound, and then, used in the light diffusion layer coating liquid in the form of a dispersion liquid. According to this procedure, a high porosity light diffusion layer can be obtained, and excellent effect can be obtained in image visibility. As the dispersing method, it is preferred that fumed silica and a dispersing medium are premixed by general propeller stirring, turbine type stirring, homomixer type stirring, etc., next, dispersed by using a media mill such as a ball mill, a beads mill, and a sand grinder, a pressure type dispersing machine such as a high pressure homogenizer, and an ultra high pressure homogenizer, an ultrasonic wave dispersing machine, and a thin film rotation type dispersing machine, etc. As the cationic compound, a cationic compound containing a quaternary ammonium salt is preferred, and diallylamine derivative is particularly preferably used. As the water-soluble polyvalent metal compound, an aluminum compound such as polyaluminum chloride, etc., and a compound comprising Group 4A metal (for example, zirconium, titanium) of the Periodic Table is preferred. An amount of these dispersing agents is preferably 0.05 to 13% by mass based on the fumed silica. Also, these dispersing agents may be used two kinds or more in combination. As the dispersing medium, water may be used, and a water-soluble organic solvent such as ethanol and acetone, may be contained therein.

In the present invention, wet process silica pulverized to have an average secondary particle diameter of 500 nm or less can be also preferably used. As the wet process silica used here, precipitated silica or gel method silica is preferred, and precipitated silica is more preferred. As the wet process silica particles used in the present invention, wet process silica particles having an average primary particle diameter of 18 nm or less, and an average secondary particle diameter before pulverization of 5 to 50 μm are preferred. These particles are preferably used by pulverizing them to an average secondary particle diameter of 500 nm or less in the presence of a dispersing agent such as a cationic compound and a water-soluble polyvalent metal compound. As the dispersing agent such as a cationic compound and a water-soluble polyvalent metal compound, the same materials as those to be used for dispersing the above-mentioned fumed silica can be used.

The alumina which can be used in the present invention may be preferably γ-alumina that is a γ type crystal of aluminum oxide, and among these, a δ group crystal is preferred. As the alumina, those in which secondary particles generally having a secondary particle diameter of from several thousands to several ten thousands nm are pulverized by ultrasonic wave or by a high pressure homogenizer, a counter collision type jet pulverizer, etc., to have an average secondary particle diameter of 500 nm or less, preferably 20 to 300 nm or so can be used.

The alumina hydrate which can be used in the present invention is generally represented by the structural formula: $Al_2O_3 \cdot nH_2O$ (n=1 to 3). The alumina hydrate can be obtained by the conventionally known preparation method such as hydrolysis of aluminum alkoxide such as aluminum isopropoxide, neutralization of an aluminum salt by an alkali, hydrolysis of an aluminate, etc.

The above-mentioned alumina and alumina hydrate to be used in the present invention is preferably used in the light diffusion layer coating liquid in the form of a dispersion after dispersing in a dispersing medium in the presence of the conventionally known dispersing agent such as acetic acid, lactic acid, formic acid, or nitric acid.

As the inorganic fine particles contained in the xerogel of the present invention, two or more kinds of the inorganic fine particles among the above-mentioned inorganic fine particles may be used in combination. For example, there may be mentioned a combination of the pulverized wet process silica and fumed silica, a combination of the pulverized wet process silica and alumina or alumina hydrate, a combination of fumed silica and alumina or alumina hydrate. The proportion when these materials are used in combination is preferably in the range of 7:3 to 3:7 in either of the embodiments. Incidentally, the light diffusion layer in the present invention is preferably a layer formed by coating a light diffusion layer coating liquid which contains the inorganic fine particles contained in the above-mentioned xerogel in an amount of 50% by mass or more, more preferably 70% by mass or more based on the total solid component on a light transmissive support, and drying.

In the present invention, the resin binder contained in the xerogel in the light diffusion layer is not particularly limited, and a hydrophilic resin binder having high transparency is preferably used. There may be mentioned, for example, polyvinyl alcohol, gelatin, polyethylene oxide, polyvinylpyrrolidone, polyacrylic acid, polyacrylamide, polyurethane, dextran, dextrin, carrageenan (κ, ι, λ, etc.), agar, pullulan, water-soluble polyvinyl butyral, hydroxyethyl cellulose, carboxymethyl cellulose, etc. These hydrophilic resin binders may be used in two or more kinds in combination. Preferred hydrophilic resin binder is a completely or partially saponified polyvinyl alcohol, and a cation-modified polyvinyl alcohol.

A content of the resin binder contained in the xerogel in the light diffusion layer of the present invention is preferably 3 to 100% by mass, more preferably 5 to 85% by mass, and further preferably 10 to 65% by mass based on the amount of the inorganic fine particles contained in the xerogel since fine voids are formed to form a porous layer (a layer containing a large amount of air). According to this constitution, a transmission type screen having excellent image visibility and high transparency, etc., can be realized. Also, a content of the light diffusion fine particles in the light diffusion layer of the present invention is, when the transmission type screen of the present invention is used for the uses which do not require transparency, preferably 3 to 70% by mass based on an amount of the inorganic fine particles contained in the xerogel. When the transmission type screen of the present invention is used for the uses which require transparency, the content is preferably 0.1 to 40% by mass, more preferably 0.3 to 20% by mass based on an amount of the inorganic fine particles contained in the xerogel.

In the light diffusion layer of the present invention, a crosslinking agent of the resin binder may be used depending on necessity. Specific examples of the crosslinking agent include aldehyde compound such as formaldehyde and glutaraldehyde, ketone compound such as diacetyl and chloropentanedione, bis(2-chloroethyl)urea, 2-hydroxy-4,6-dichloro-1,3,5-triazine, a compound having a reactive halogen as disclosed in U.S. Pat. No. 3,288,775, divinylsulfone, a compound having a reactive olefin as disclosed in U.S. Pat. No. 3,635,718, N-methylol compound as disclosed in U.S. Pat. No. 2,732,316, isocyanate as disclosed in U.S. Pat. No. 3,103,437, aziridine compound as disclosed in U.S. Pat. No. 3,017,280 and U.S. Pat. No. 2,983,611, carbodiimide compound as disclosed in U.S. Pat. No. 3,100,704, epoxy compound as disclosed in U.S. Pat. No. 3,091,537, halogen carboxyaldehydes such as mucochloric acid, dioxane derivative such as dihydroxydioxane, an inorganic crosslinking agent such as chromium alum, zirconium sulfate, borax, boric acid, borate. These may be used in a single kind or two or more kinds in combination.

A coating amount of a dried solid content of the light diffusion layer is preferably in the range of 1 to 50 $g/m^2$, more preferably in the range of 3 to 40 $g/m^2$, further preferably in the range of 5 to 30 $g/m^2$. To the light diffusion layer may be further added cationic polymer, a preservative, a surfactant, a coloring dye, a coloring pigment, an UV absorber, an anti-oxidant, a dispersing agent of the pigment, a defoamer, a leveling agent, an optical brightener, a viscosity stabilizer, a pH controller, etc.

The light diffusion layer may be constituted by two or more layers, and in this case, the constitutions of these light diffusion layers may be the same or different from each other.

Incidentally, when a plural number of the light diffusion layers are present, the light diffusion fine particles can be contained in at least one of the light diffusion layers.

The transmission type screen of the present invention may be manufactured, for example, by coating a light diffusion layer coating liquid containing light diffusion fine particles and a xerogel starting material(s) in a solvent on a light transmissive support, and drying the same to form the light diffusion layer on the light transmissive support. According to this procedure, the light diffusion layer in which the light diffusion fine particles are carried on the xerogel can be obtained. As the solvent, water may be used mainly, and the solvent may contain a water-soluble organic solvent such as ethanol and acetone. As the coating method used for coating the light diffusion layer, the conventionally known various kinds of coating methods may be used. There are, for example, a slide bead method, a slide curtain method, an extrusion method, a slot die method, a gravure roll method, an air knife method a blade coating method, a rod bar coating method, etc. The drying method of the light diffusion layer may be any of the methods, and preferred is a method in which the coated layer is once cooled immediately after coating, and then, dried at a high temperature. In particular, it is preferred that a coating liquid of 30 to 60° C. is coated by the above-mentioned coating method, and once after cooling to 20° C. or lower, preferably 10° C. or lower, then, dried at 20° C. or higher, preferably 30 to 70° C. By employing such coating and drying processes, a good light diffusion layer with less coating defects can be obtained.

The light transmissive support possessed by the transmission type screen of the present invention is not particularly limited so long as it has a light transmitting property, and a plate-shaped material comprising a glass or plastics, a film state material, etc., or a layer having a light transmitting property is provided thereon may be used. A kind of the glass is not particularly limited and generally an oxide glass such as silicate glass, phosphate glass, borate glass, is practically used, and silicate glass such as silicate glass, alkali silicate glass, soda-lime glass, potassium lime glass, lead glass, barium glass, borosilicate glass, etc., are more preferred. As the plastics, there may be used, for example, polyethylene terephthalate, polybutylene terephthalate, polyethylene naphthalate, polycarbonate, polypropylene, polyethylene, polyallylate, acryl, acetyl cellulose, polyvinyl chloride, etc., and those subjected to stretching process, in particular, a biaxially stretching process are preferred since mechanical strength is improved. Incidentally, the haze value of the light transmissive support is preferably 30% or less.

A thickness of the light transmissive support of the present invention may be appropriately selected depending on the material to be applied, and generally 10 μm to 30 mm, preferably 20 μm to 20 mm or so.

Also, an adhesive layer may be provided on upper surface of the light diffusion layer, an opposite surface of the light transmissive support from the light diffusion layer surface, and both surfaces of the same. On the transmission type screen on which the adhesive layer has been provided as mentioned above may be provided the conventionally known separate substrate such as a film or paper, for protecting the adhesive layer. When the transmission type screen is used, the separate substrate is peeled off and the transmission type screen is adhered to a substrate to be adhered and used. As the substrate to be adhered represented by a display window, etc., is not particularly limited, and when the transmission type screen of the present invention is used for the uses which require transparency, a material which does not inhibit transparency of the transmission type screen is preferred. Incidentally, as such an adhesive layer, a synthetic resin adhesive generally used such as acrylic type, silicone type, urethane type, and rubber type may be used. As the separate substrate, for example, polyethylene terephthalate, polybutylene terephthalate, polyethylene naphthalate, polycarbonate, polypropylene, polyethylene, polyallylate, acryl, acetyl cellulose, polyvinyl chloride, etc may be used.

Also, onto the surface of the light transmissive support, an easy adhesion treatment may be carried out or separately an easy adhesion layer may be provided for the purpose of improving adhesive property between the light diffusion layer and the light transmissive support, or for the purpose of improving adhesive property between the above-mentioned adhesive layer and the light transmissive support.

The transmission type screen of the present invention may have a conventionally known antireflection layer which has a property of cancelling out reflected light by utilizing the light interference by the layer interface on at least one surface thereof. According to this constitution, an image projected by the projector can be visually recognized clearly. As the antireflection layer, there may be used, for example, a single layer material in which a low refractive index layer having high transparency such as silicon oxide and lithium fluoride, is so provided that it becomes an optical thin film with ¼ of the main wavelength, or a material in which a high refractive index layer(s) such as titanium oxide and zinc oxide, is/are appropriately laminated on the low refractive index layer, etc.

Further, the transmission type screen of the present invention may be provided at least one of the uppermost surface thereof a conventionally known hard coating layer for heightening strength of the screen, a diffusion preventive layer or an antistatic layer.

The transmission type screen of the present invention can be used by projecting an image of a projector from both of the light diffusion layer side or the opposite side thereof. Also, in the case of the transmission type screen in general, when the image is projected parallel to the perpendicular line of the screen, the hot spot phenomenon cannot be avoided, so that the projector shall be preferably used by making a central projecting direction to have an angle to the perpendicular line of the screen with a certain degree, and an ultra short throw projector which can project an image from a lower portion within easy reach of the screen, etc., is preferably used.

In the following, the present invention is explained in detail by referring to Examples, but the content of the present invention is not limited by Examples. Incidentally, parts represent parts by mass of a solid component or a substantial component.

EXAMPLES

Example 1

On one surface of a transparent polyethylene terephthalate film having a thickness of 100 μm (haze value: 4%) was coated the light diffusion layer coating liquid 1 having the following composition so that a coating amount of the solid content was 18.5 g/m$^2$ using a slide bead coating apparatus, blew cold air of 10° C. thereto, and dried it by blowing hot air of 50° C. to prepare a transmission type screen of Example 1. Incidentally, when a void volume was measured by using a mercury porosimeter (Autopore II 9220 manufactured by Micromeritics Instrument Corporation), it was 17 ml/m$^2$. A thickness of the light diffusion layer by observing the cross section using an electron microscope was 27 μm, and a porosity calculated from these values was 64%. Also, the specific surface area of the light diffusion fine particles per a unit area of the screen calculated from an average primary particle diameter and a specific gravity was 4.2 m²/m².

<Preparation of Silica Dispersion Liquid 1>

To water were added 4 parts of dimethyldiallylammonium chloride homopolymer (Molecular weight: 9,000) and 100 parts of a fumed silica (Average primary particle diameter: 7 nm, specific surface area: 300 m²/g) to prepare a provisional dispersion liquid, and then, treated by a high-pressure homogenizer to prepare a silica dispersion liquid in a dispersed colloidal state with a concentration of the solid content of 20%. The average secondary particle diameter measured by using LA910 manufactured by HORIBA Ltd., was 80 nm. In the following, the average secondary particle diameter is a value measured by using LA910.

<Light Diffusion Layer Coating Liquid 1>

Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 5.6 parts
(Optobeads 500S available from Nissan Chemical Industries, Ltd., silica and melamine resin composite fine particles (mainly comprising melamine resin), dispersed in a single particle form, average primary particle diameter: 0.5 μm, true specific gravity: 2.2, refractive index: 1.65)

The liquid was so adjusted with water that the total concentration of the solid contents became 12%.

Incidentally, a liquid in which light diffusion fine particles have not been added to the light diffusion layer coating liquids used in Example 1 and Examples 2 to 35 mentioned below was each in a dispersed colloidal state. This means that the light diffusion layers of Examples 1 to 35 contain the light diffusion fine particles and the xerogel. A liquid in which light diffusion fine particles have not been added to the light diffusion layer coating liquids used in Comparative examples 1 to 5 was each not in a dispersed colloidal state. This means that the light diffusion layers of Comparative examples 1 to 5 contain the light diffusion fine particles but do not contain the xerogel.

Example 2

In the same manner as in Example 1 except for replacing the light diffusion layer coating liquid 1 of Example 1 with the light diffusion layer coating liquid 2 mentioned below, a transmission type screen of Example 2 was prepared. Incidentally, the porosity measured in the same manner as in Example 1 was 52%, and the specific surface area of the light diffusion fine particles per a unit area of the screen calculated from an average primary particle diameter and a specific gravity was 4.2 m²/m².

<Light Diffusion Layer Coating Liquid 2>

Silica dispersion liquid 1 (as silica solid content): 100 parts
Polyvinyl alcohol: 60 parts
(Saponification degree: 88%, average polymerization degree: 3500)
Boric acid: 4 parts
Nonionic surfactant: 0.3 part
(Polyoxyethylene alkyl ether)
Light diffusion fine particles: 7.2 parts
(Optobeads 500S)

The liquid was so adjusted with water that the total concentration of the solid contents became 12%.

Example 3

In the same manner as in Example 1 except for replacing the light diffusion layer coating liquid 1 of Example 1 with the light diffusion layer coating liquid 3 mentioned below, a transmission type screen of Example 3 was prepared. Incidentally, the porosity measured in the same manner as in Example 1 was 49%, the specific surface area of the light diffusion fine particles per a unit area of the screen calculated from an average primary particle diameter and a specific gravity was 4.2 m²/m².

<Light Diffusion Layer Coating Liquid 3>

Silica dispersion liquid 1 (as silica solid content): 100 parts
Polyvinyl alcohol: 70 parts
(Saponification degree: 88%, average polymerization degree: 3500)
Boric acid: 4 parts
Nonionic surfactant: 0.3 part
(Polyoxyethylene alkyl ether)
Light diffusion fine particles: 7.6 parts
(Optobeads 500S)

The liquid was so adjusted with water that the total concentration of the solid contents became 12%.

Example 4

In the same manner as in Example 1 except for replacing the light diffusion layer coating liquid 1 of Example 1 with the light diffusion layer coating liquid 4 mentioned below, a transmission type screen of Example 4 was prepared. Incidentally, the porosity measured in the same manner as in Example 1 was 63%.

<Preparation of Silica Dispersion Liquid 2>

To water were added 4 parts of dimethyldiallylammonium chloride homopolymer (Molecular weight: 9,000) and 100 parts of fumed silica (Average primary particle diameter: 12 nm, specific surface area: 200 m²/g) to prepare a provisional dispersion liquid, and then, treated by a high-pressure homogenizer to prepare a silica dispersion liquid in a dispersed colloidal state with a concentration of the solid content of 20%. The average secondary particle diameter was 100 nm.

<Light Diffusion Layer Coating Liquid 4>

Silica dispersion liquid 2 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 5.6 parts
(Optobeads 500S)

The liquid was so adjusted with water that the total concentration of the solid contents became 12%.

Example 5

In the same manner as in Example 1 except for replacing the light diffusion layer coating liquid 1 of Example 1 with the light diffusion layer coating liquid 5 mentioned below, a transmission type screen of Example 5 was prepared. Incidentally, the porosity measured in the same manner as in Example 1 was 61%.

<Preparation of Silica Dispersion Liquid 3>

To water were added 3.5 parts of dimethyldiallylammonium chloride homopolymer (Molecular weight: 9,000) and 100 parts of fumed silica (Average primary particle diameter: 16 nm, specific surface area: 130 $m^2/g$) to prepare a provisional dispersion liquid, and then, treated by a high-pressure homogenizer to prepare a silica dispersion liquid in a dispersed colloidal state with a concentration of the solid content of 20%. The average secondary particle diameter was 120 nm.

<Light Diffusion Layer Coating Liquid 5>
Silica dispersion liquid 3 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 5.6 parts
(Optobeads 500S)

The liquid was so adjusted with water that the total concentration of the solid contents became 12%.

Example 6

In the same manner as in Example 1 except for replacing the light diffusion layer coating liquid 1 of Example 1 with the light diffusion layer coating liquid 6 mentioned below, a transmission type screen of Example 6 was prepared. Incidentally, the porosity measured in the same manner as in Example 1 was 55%, the specific surface area of the light diffusion fine particles per a unit area of the screen calculated from an average primary particle diameter and a specific gravity was 4.2 $m^2/m^2$.

<Preparation of Alumina Dispersion Liquid>

To aqueous nitric acid with a concentration of 20 mmol/l was added alumina hydrate (an average primary particle diameter: 14 nm), and the mixture was treated by Homodisper to prepare a dispersed colloidal state alumina dispersion liquid with a solid content concentration of 30%. The average secondary particle diameter was 160 nm.

<Light Diffusion Layer Coating Liquid 6>
Alumina dispersion liquid (as alumina solid content): 100 parts
Polyvinyl alcohol: 10 parts
(Saponification degree: 88%, average polymerization degree: 3500)
Boric acid: 0.5 part
Nonionic surfactant: 0.3 part
(Polyoxyethylene alkyl ether)
Light diffusion fine particles: 4.8 parts
(Optobeads 500S)

The liquid was so adjusted with water that the total concentration of the solid contents became 12%.

Example 7

In the same manner as in Example 1 except for replacing the light diffusion layer coating liquid 1 of Example 1 with the light diffusion layer coating liquid 7 mentioned below, a transmission type screen of Example 7 was prepared. Incidentally, the porosity measured in the same manner as in Example 1 was 53%, and the specific surface area of light diffusion fine particles per a unit area of the screen was 1.8 $m^2/m^2$.

<Light Diffusion Layer Coating Liquid 7>
Silica dispersion liquid 1 (as silica solid content): 100 parts
Polyvinyl alcohol: 60 parts
(Saponification degree: 88%, average polymerization degree: 3500)
Boric acid: 4 parts
Nonionic surfactant: 0.3 part
(Polyoxyethylene alkyl ether)
Light diffusion fine particles: 50 parts
(Optobeads 6500M available from Nissan Chemical Industries, Ltd., silica and melamine resin composite fine particles (mainly comprising melamine resin), dispersed in a single particle form, an average primary particle diameter: 6.5 μm, true specific gravity: 2.2, refractive index: 1.65)

The liquid was so adjusted with water that the total concentration of the solid contents became 12%.

Example 8

In the same manner as in Example 1 except for replacing the light diffusion layer coating liquid 1 of Example 1 with the light diffusion layer coating liquid 8 mentioned below, a transmission type screen of Example 8 was prepared. Incidentally, the porosity measured in the same manner as in Example 1 was 53%, and the specific surface area of light diffusion fine particles per a unit area of the screen was 3.3 $m^2/m^2$.

<Light Diffusion Layer Coating Liquid 8>
Silica dispersion liquid 1 (as silica solid content) 100 parts
Polyvinyl alcohol: 60 parts
(Saponification degree: 88%, average polymerization degree: 3500)
Boric acid: 4 parts
Nonionic surfactant: 0.3 part
(Polyoxyethylene alkyl ether)
Light diffusion fine particles: 56 parts
(SBX-8 available from Sekisui Plastics Co., Ltd., crosslinked polystyrene fine particles, dispersed in a single particle form, average primary particle diameter: 8.0 μm, true specific gravity: 1.06, refractive index: 1.59)

The liquid was so adjusted with water that the total concentration of the solid contents became 12%.

Example 9

In the same manner as in Example 1 except for replacing the light diffusion layer coating liquid 1 of Example 1 with the light diffusion layer coating liquid 9 mentioned below, a transmission type screen of Example 9 was prepared. Incidentally, the porosity measured in the same manner as in Example 1 was 53%, and the specific surface area of light diffusion fine particles per a unit area of the screen was 3.3 $m^2/m^2$.

<Light Diffusion Layer Coating Liquid 9>
Silica dispersion liquid 1 (as silica solid content): 100 parts
Polyvinyl alcohol: 60 parts
(Saponification degree: 88%, average polymerization degree: 3500)
Boric acid: 4 parts
Nonionic surfactant: 0.3 part
(Polyoxyethylene alkyl ether)
Light diffusion fine particles: 65 parts
(SSX-108 available from Sekisui Plastics Co., Ltd., crosslinked polymethyl methacrylate, dispersed in a single particle form, average primary particle diameter: 8.0 μm, true specific gravity: 1.19, refractive index: 1.49)

The liquid was so adjusted with water that the total concentration of the solid contents became 12%.

Example 10

In the same manner as in Example 1 except for replacing the light diffusion layer coating liquid 1 of Example 1 with the light diffusion layer coating liquid 10 mentioned below, a transmission type screen of Example 10 was prepared. MIZKASIL P78A which is light diffusion fine particles was used by previously subjecting to dispersing treatment so that an average secondary particle diameter of which became 6.0 μm with a solid content concentration of 15% by a homogenizer. Incidentally, the porosity measured in the same manner as in Example 1 was 56%.

<Light Diffusion Layer Coating Liquid 10>
Silica dispersion liquid 1 (as silica solid content): 100 parts
Polyvinyl alcohol: 60 parts
(Saponification degree: 88%, average polymerization degree: 3500)
Boric acid: 4 parts
Nonionic surfactant: 0.3 part
(Polyoxyethylene alkyl ether)
Light diffusion fine particles: 60 parts
(P-78A available from Mizusawa Industrial Chemicals, Ltd., amorphous synthetic silica (gel method silica), dispersed in an aggregated form, an average secondary particle diameter: 6.0 μm, refractive index: 1.45)

The liquid was so adjusted with water that the total concentration of the solid contents became 12%.

Comparative Example 1

In the same manner as in Example 1 except for replacing the light diffusion layer coating liquid 1 of Example 1 with the light diffusion layer coating liquid 11 mentioned below, a transmission type screen of Comparative example 1 was prepared. Incidentally, the porosity measured in the same manner as in Example 1 was 0%, and the specific surface area of light diffusion fine particles per a unit area of the screen was 7.5 m²/m².

<Light Diffusion Layer Coating Liquid 11>
Alkali treated gelatin: 100 parts
Nonionic surfactant: 0.3 part
(Polyoxyethylene alkyl ether)
Light diffusion fine particles: 8.0 parts
(Optobeads 500S)

The liquid was so adjusted with water that the total concentration of the solid contents became 12%.

Comparative Example 2

In the same manner as in Example 1 except that the below mentioned light diffusion layer coating liquid 12 was coated on one surface of a transparent polyethylene terephthalate film (haze value 4%) with a thickness of 100 μm so that a coating amount of the solid content was 18.5 g/m² using a rod bar coating apparatus and dried by blowing hot air of 90° C., a transmission type screen of Comparative example 2 was prepared. Incidentally, the porosity measured in the same manner as in Example 1 was 10%.

<Light Diffusion Layer Coating Liquid 12>
Acrylic resin: 25 parts
Light diffusion fine particles: 10 parts
(Porous fine particles comprising $SiO_2$, average primary particle diameter: 3 μm, specific surface area: 800 m²/g)

The liquid was so adjusted with xylene that the total concentration of the solid contents became 35%.

With regard to the transmission type screens obtained in Examples 1 to 10, and Comparative examples 1 and 2, a haze value and a total light transmittance were each measured in conformity with JIS-K7105. Thereafter, an opposite surface of the transmission type screen from the light diffusion layer was laminated on the transparent acrylic plate, an image was actually projected from a light diffusion layer side using a digital projector (MP515ST manufactured by BenQ), and the image projected on the screen was observed from an opposite side of the projector and the projector side. Incidentally, the projector was projected while maintaining the central projecting direction to have an angle of about 30° to the perpendicular line of the screen from an upper direction. In this state, a viewing angle at which an image projected by a projector can be visually recognized, and visibility from both surfaces of the screen were evaluated according to the following criteria. The results of these haze value, viewing angle and visibility from the both surfaces are shown in Table 1. Incidentally, total light transmittance of the transmission type screens of Examples 1 to 10, and Comparative examples 1 and 2 all exceeded 50%.

<Viewing Angle>
Viewing angle in the horizontal direction from the opposite side of the projector was changed from 0° (a visual line direction is the perpendicular line direction of the screen) to 90° (a visual line direction is the surface direction of the screen) and observed, and evaluated according to the following criterion.

4: Image can be sufficiently recognized in the whole angles and viewing angle is extremely wide.

3: Slightly inferior to the above-mentioned 4, but image can be recognized in the whole angles and viewing angle is wide.

2: Image is slightly difficult to recognize at high viewing angle of around 90°.

1: Image is difficult to recognize at high viewing angle of around 90°.

<Visibility from Both Surfaces>
The image projected on the screen was observed from an opposite side of the projector and the projector side, and evaluated by the following evaluation criterion.

3: Luminance of the image from the both sides are high, and it is at a level in which luminance difference between both sides cannot be felt.

2: Luminance difference between both sides is small, but overall luminance is slightly low.

1: Luminance difference between both sides is large, and overall luminance is low.

TABLE 1

|  | Haze value | Viewing angle | Visibility from both surfaces |
|---|---|---|---|
| Example 1 | 83 | 4 | 3 |
| Example 2 | 82 | 4 | 3 |
| Example 3 | 81 | 3 | 3 |
| Example 4 | 82 | 4 | 3 |
| Example 5 | 82 | 4 | 3 |
| Example 6 | 82 | 4 | 3 |
| Example 7 | 82 | 4 | 3 |
| Example 8 | 82 | 4 | 3 |
| Example 9 | 82 | 3 | 3 |
| Example 10 | 81 | 3 | 3 |
| Comparative example 1 | 82 | 1 | 1 |
| Comparative example 2 | 70 | 1 | 1 |

From the results shown in Table 1, it can be understood that, according to the present invention, a transmission type screen having an extremely wide viewing angle at which an image projected by a projector can be visually recognized, and having excellent visibility from both sides of the screen can be obtained.

Example 11

In the same manner as in Example 1 except for replacing the light diffusion layer coating liquid 1 of Example 1 with the light diffusion layer coating liquid 13 mentioned below, a transmission type screen of Example 11 was prepared. Incidentally, the porosity measured in the same manner as in Example 1 was 63%, the specific surface area of the light diffusion fine particles per a unit area of the screen calculated from an average primary particle diameter and a specific gravity was 0.6 m$^2$/m$^2$.

<Light Diffusion Layer Coating Liquid 13>
Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 0.76 part
(Optobeads 500S)
The liquid was so adjusted with water that the total concentration of the solid contents became 12%.

Example 12

In the same manner as in Example 1 except for replacing the light diffusion layer coating liquid 1 of Example 1 with the light diffusion layer coating liquid 14 mentioned below, a transmission type screen of Example 12 was prepared. Incidentally, the porosity measured in the same manner as in Example 1 was 51%, the specific surface area of the light diffusion fine particles per a unit area of the screen calculated from an average primary particle diameter and a specific gravity was 0.6 m$^2$/m$^2$.

<Light Diffusion Layer Coating Liquid 14>
Silica dispersion liquid 1 (as silica solid content): 100 parts
Polyvinyl alcohol: 60 parts
(Saponification degree: 88%, average polymerization degree: 3500)
Boric acid: 4 parts
Nonionic surfactant: 0.3 part
(Polyoxyethylene alkyl ether)
Light diffusion fine particles: 0.98 part
(Optobeads 500S)
The liquid was so adjusted with water that the total concentration of the solid contents became 12%.

Example 13

In the same manner as in Example 1 except for replacing the light diffusion layer coating liquid 1 of Example 1 with the light diffusion layer coating liquid 15 mentioned below, a transmission type screen of Example 13 was prepared. Incidentally, the porosity measured in the same manner as in Example 1 was 48%, the specific surface area of the light diffusion fine particles per a unit area of the screen calculated from an average primary particle diameter and a specific gravity was 0.6 m$^2$/m$^2$.

<Light Diffusion Layer Coating Liquid 15>
Silica dispersion liquid 1 (as silica solid content): 100 parts
Polyvinyl alcohol: 70 parts
(Saponification degree: 88%, average polymerization degree: 3500)
Boric acid: 4 parts
Nonionic surfactant: 0.3 part
(Polyoxyethylene alkyl ether)
Light diffusion fine particles: 1.04 parts
(Optobeads 500S)
The liquid was so adjusted with water that the total concentration of the solid contents became 12%.

Example 14

In the same manner as in Example 1 except for replacing the light diffusion layer coating liquid 1 of Example 1 with the light diffusion layer coating liquid 16 mentioned below, a transmission type screen of Example 14 was prepared. Incidentally, the porosity measured in the same manner as in Example 1 was 62%.

<Light Diffusion Layer Coating Liquid 16>
Silica dispersion liquid 2 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 0.76 part
(Optobeads 500S)
The liquid was so adjusted with water that the total concentration of the solid contents became 12%.

Example 15

In the same manner as in Example 1 except for replacing the light diffusion layer coating liquid 1 of Example 1 with the light diffusion layer coating liquid 17 mentioned below, a transmission type screen of Example 15 was prepared. Incidentally, the porosity measured in the same manner as in Example 1 was 60%.

<Light Diffusion Layer Coating Liquid 17>
Silica dispersion liquid 3 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 0.76 part
(Optobeads 500S)
The liquid was so adjusted with water that the total concentration of the solid contents became 12%.

Example 16

In the same manner as in Example 1 except for replacing the light diffusion layer coating liquid 1 of Example 1 with the light diffusion layer coating liquid 18 mentioned below, a transmission type screen of Example 16 was prepared. Incidentally, the porosity measured in the same manner as in Example 1 was 54%.

<Light Diffusion Layer Coating Liquid 18>
Alumina dispersion liquid (as alumina solid content): 100 parts
Polyvinyl alcohol: 10 parts
(Saponification degree: 88%, average polymerization degree: 3500)
Boric acid: 0.5 part
Nonionic surfactant: 0.3 part
(Polyoxyethylene alkyl ether)
Light diffusion fine particles: 0.66 part
(Optobeads 500S)

The liquid was so adjusted with water that the total concentration of the solid contents became 12%.

Example 17

In the same manner as in Example 1 except for replacing the light diffusion layer coating liquid 1 of Example 1 with the light diffusion layer coating liquid 19 mentioned below, a transmission type screen of Example 17 was prepared. Incidentally, the porosity measured in the same manner as in Example 1 was 63%, and the specific surface area of light diffusion fine particles per a unit area of the screen was 0.6 $m^2/m^2$.

<Light Diffusion Layer Coating Liquid 19>
Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 3.07 parts
(Optobeads 2000M available from Nissan Chemical Industries, Ltd., silica and melamine resin composite fine particles (mainly comprising melamine resin), dispersed in a single particle form, average particle diameter: 2.0 μm, true specific gravity: 2.2, refractive index: 1.65)
The liquid was so adjusted with water that the total concentration of the solid contents became 12%.

Example 18

In the same manner as in Example 1 except for replacing the light diffusion layer coating liquid 1 of Example 1 with the light diffusion layer coating liquid 20 mentioned below, a transmission type screen of Example 18 was prepared. Incidentally, the porosity measured in the same manner as in Example 1 was 63%, and the specific surface area of light diffusion fine particles per a unit area of the screen was 0.6 $m^2/m^2$.

<Light Diffusion Layer Coating Liquid 20>
Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 5.48 parts
(Optobeads 3500M available from Nissan Chemical Industries, Ltd., silica and melamine resin composite fine particles (mainly comprising melamine resin), dispersed in a single particle form, average particle diameter: 3.5 μm, true specific gravity: 2.2, refractive index: 1.65)
The liquid was so adjusted with water that the total concentration of the solid contents became 12%.

Example 19

In the same manner as in Example 1 except for replacing the light diffusion layer coating liquid 1 of Example 1 with the light diffusion layer coating liquid 21 mentioned below, a transmission type screen of Example 19 was prepared. Incidentally, the porosity measured in the same manner as in Example 1 was 63%, and the specific surface area of light diffusion fine particles per a unit area of the screen was 0.6 $m^2/m^2$.

<Light Diffusion Layer Coating Liquid 21>
Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 10.3 parts
(Optobeads 6500M)
The liquid was so adjusted with water that the total concentration of the solid contents became 12%.

Example 20

In the same manner as in Example 1 except for replacing the light diffusion layer coating liquid 1 of Example 1 with the light diffusion layer coating liquid 22 mentioned below, a transmission type screen of Example 20 was prepared. Incidentally, the porosity measured in the same manner as in Example 1 was 63%, and the specific surface area of light diffusion fine particles per a unit area of the screen was 0.6 $m^2/m^2$.

<Light Diffusion Layer Coating Liquid 22>
Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 17.3 parts
(Optobeads 10500M available from Nissan Chemical Industries, Ltd., silica and melamine resin composite fine particles (mainly comprising melamine resin), dispersed in a single particle form, average particle diameter: 10.5 μm, true specific gravity: 2.2, refractive index: 1.65)
The liquid was so adjusted with water that the total concentration of the solid contents became 12%.

Example 21

In the same manner as in Example 1 except for replacing the light diffusion layer coating liquid 1 of Example 1 with the light diffusion layer coating liquid 23 mentioned below, a transmission type screen of Example 21 was prepared. Incidentally, the porosity measured in the same manner as in Example 1 was 63%, and the specific surface area of light diffusion fine particles per a unit area of the screen was 2.2 $m^2/m^2$.

<Light Diffusion Layer Coating Liquid 23>
Silica dispersion liquid 1 (as silica solid content): 100 parts
Polyvinyl alcohol: 23 parts
(Saponification degree: 88%, average polymerization degree: 3500)
Boric acid: 4 parts
Nonionic surfactant: 0.3 part
(Polyoxyethylene alkyl ether)
Light diffusion fine particles: 3.04 parts
(SSX-101 available from Sekisui Plastics Co., Ltd., cross-linked polymethyl methacrylate, dispersed in a single particle form, average particle diameter: 1.0 μm, true specific gravity: 1.19, refractive index: 1.49)
The liquid was so adjusted with water that the total concentration of the solid contents became 12%.

Comparative Example 3

In the same manner as in Example 1 except for replacing the light diffusion layer coating liquid 1 of Example 1 with the light diffusion layer coating liquid 24 mentioned below, a transmission type screen of Comparative example 3 was prepared. Incidentally, the porosity measured in the same manner as in Example 1 was 0%, and the specific surface area of light diffusion fine particles per a unit area of the screen was 0.6 m²/m².

<Light Diffusion Layer Coating Liquid 24>
Alkali treated gelatin: 100 parts
Nonionic surfactant: 0.3 part
(Polyoxyethylene alkyl ether)
Light diffusion fine particles: 0.76 part
(Optobeads 500S)

The liquid was so adjusted with water that the total concentration of the solid contents became 12%.

Comparative Example 4

In the same manner as in Example 1 except for replacing the light diffusion layer coating liquid 1 of Example 1 with the light diffusion layer coating liquid 25 mentioned below, a transmission type screen of Comparative example 4 was prepared. Incidentally, the porosity measured in the same manner as in Example 1 was 0%, and the specific surface area of light diffusion fine particles per a unit area of the screen was 3.7 m²/m².

<Light Diffusion Layer Coating Liquid 25>
Alkali treated gelatin: 100 parts
Nonionic surfactant: 0.3 part
(Polyoxyethylene alkyl ether)
Light diffusion fine particles: 3.80 parts
(Optobeads 500S)

The liquid was so adjusted with water that the total concentration of the solid contents became 12%.

With regard to the transmission type screens obtained in Examples 11 to 21, and Comparative examples 2 to 4, transparency and image visibility were evaluated based on the following criteria. The results thereof are shown in Table 2. Incidentally, the total light transmittances of the transmission type screens of Examples 11 to 21, and Comparative examples 3 and 4 were all more than 50%.

<Transparency>
With regard to the transparency, the haze value of the obtained transmission type screen was measured by using a measurement apparatus (Haze Computer HZ-2 manufactured by Suga Test Instruments Co., Ltd.) which complied with JIS-K7105, and evaluated based on the following evaluation criterion.

4: The haze value is 50 or less.
3: The haze value exceeds 50 and is 60 or less.
2: The haze value exceeds 60 and is 70 or less.
1: The haze value exceeds 70.

<Image Visibility>
Regarding image visibility, an opposite surface of the transmission type screen from the light diffusion layer was laminated on a transparent acryl plate, an image was actually projected from the light diffusion layer side using a digital projector (MP515ST manufactured by BenQ), and the visibility of the image projected on the screen from the opposite side of the projector was evaluated with naked eyes based on the following evaluation criterion. Incidentally, the projector was projected while maintaining the central projecting direction to have an angle of about 30° to the perpendicular line of the screen from an upper direction, and the evaluator evaluated the image with naked eyes at the position confronted with the screen.

4: Luminance of the image is significantly high and image visibility is very good.

3: Luminance of the image is high and image visibility is good.
2: Image visibility of the image is not at the above-mentioned level 3 but is at an acceptable level.
1: Luminance of the image is low and image visibility is poor.

TABLE 2

|  | transparency | image visibility |
|---|---|---|
| Example 11 | 4 | 4 |
| Example 12 | 3 | 4 |
| Example 13 | 2 | 4 |
| Example 14 | 3 | 4 |
| Example 15 | 3 | 4 |
| Example 16 | 4 | 4 |
| Example 17 | 4 | 4 |
| Example 18 | 3 | 4 |
| Example 19 | 3 | 4 |
| Example 20 | 2 | 4 |
| Example 21 | 4 | 4 |
| Comparative example 3 | 4 | 1 |
| Comparative example 4 | 2 | 3 |
| Comparative example 2 | 1 | 3 |

From the results shown in Table 2, it can be understood that, according to the present invention, a see-through transmission type screen which satisfies both of high transparency and image visibility of the image at the time of projection by the projector can be obtained.

Example 22

On one surface of a transparent polyethylene terephthalate film having a thickness of 100 μm (haze value: 4%) was coated the light diffusion layer coating liquid 26 having the following composition so that a coating amount of the solid content was 20.0 g/m² using a slide bead coating apparatus, blew cold air of 10° C. thereto, and dried it by blowing hot air of 50° C. to prepare a transmission type screen of Example 22. Incidentally, the respective unspecified shape light diffusion fine particles were used after adjusting the secondary particle diameter by previously dispersing with a homomixer using water as a dispersing medium. Also, a void volume was measured by using a mercury porosimeter, and it was 19.2 ml/m². A thickness of the light diffusion layer by observing the cross section thereof using an electron microscope was 34 μm, and a porosity calculated from these values was 55%. Also, the specific surface area per a unit area of the screen calculated from the average primary particle diameter and the specific gravity of the light diffusion fine particles dispersed in a single particle form was 3.1 m²/m².

<Light Diffusion Layer Coating Liquid 26>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-78A average secondary particle diameter: 6.0 μm, specific surface area: 360 m²/g, refractive index: 1.45)
Light diffusion fine particles dispersed in a single particle form: 12 parts (Optobeads 500S average primary particle diameter: 0.5 true specific gravity: 2.2, refractive index: 1.65)

The liquid was so adjusted with water that the total concentration of the solid contents became 10%.

Example 23

In the same manner as in Example 22 except for replacing the light diffusion layer coating liquid 26 of Example 22 with the light diffusion layer coating liquid 27 mentioned below, a transmission type screen of Example 23 was prepared. Incidentally; the porosity measured in the same manner as in Example 22 was 55%, and the specific surface area of the light diffusion fine particles dispersed in a single particle form per unit area of the screen was 3.1 $m^2/m^2$.

<Light Diffusion Layer Coating Liquid 27>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-707 available from Mizusawa Industrial Chemicals, Ltd., amorphous synthetic silica (gel method silica), average secondary particle diameter: 4.0 μm, specific surface area: 300 $m^2/g$, refractive index: 1.45)
Light diffusion fine particles dispersed in a single particle form: 12 parts
(Optobeads 500S)

The liquid was so adjusted with water that the total concentration of the solid contents became 10%.

Example 24

In the same manner as in Example 22 except for replacing the light diffusion layer coating liquid 26 of Example 22 with the light diffusion layer coating liquid 28 mentioned below, a transmission type screen of Example 24 was prepared. Incidentally, the porosity measured in the same manner as in Example 22 was 55%, and the specific surface area of the light diffusion fine particles dispersed in a single particle form per unit area of the screen was 3.1 $m^2/m^2$.

<Light Diffusion Layer Coating Liquid 28>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-78D available from Mizusawa Industrial Chemicals, Ltd., amorphous synthetic silica (gel method silica), average secondary particle diameter: 12.0 μm, specific surface area: 360 $m^2/g$, refractive index: 1.45)
Light diffusion fine particles dispersed in a single particle form: 12 parts
(Optobeads 500S)

The liquid was so adjusted with water that the total concentration of the solid contents became 10%.

Example 25

In the same manner as in Example 22 except for replacing the light diffusion layer coating liquid 26 of Example 22 with the light diffusion layer coating liquid 29 mentioned below, a transmission type screen of Example 25 was prepared. Incidentally, the porosity measured in the same manner as in Example 22 was 45%, and the specific surface area of the light diffusion fine particles dispersed in a single particle form per unit area of the screen was 3.1 $m^2/m^2$.

<Light Diffusion Layer Coating Liquid 29>
Silica dispersion liquid 1 (as silica solid content): 150 parts
Polyvinyl alcohol: 150 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-78A average secondary particle diameter: 6.0 μm, specific surface area: 360 $m^2/g$, refractive index: 1.45)
Light diffusion fine particles dispersed in a single particle form: 115 parts
(Optobeads 500S)

The liquid was so adjusted with water that the total concentration of the solid contents became 10%.

Example 26

In the same manner as in Example 22 except for replacing the light diffusion layer coating liquid 26 of Example 22 with the light diffusion layer coating liquid 30 mentioned below, a transmission type screen of Example 26 was prepared. Incidentally, the porosity measured in the same manner as in Example 22 was 53%, and the specific surface area of the light diffusion fine particles dispersed in a single particle form per unit area of the screen was 3.1 $m^2/m^2$.

<Light Diffusion Layer Coating Liquid 30>
Silica dispersion liquid 3 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-78A average secondary particle diameter: 6.0 μm, specific surface area: 360 $m^2/g$, refractive index: 1.45)
Light diffusion fine particles dispersed in a single particle form: 12 parts
(Optobeads 500S)

The liquid was so adjusted with water that the total concentration of the solid contents became 10%.

Example 27

In the same manner as in Example 22 except for replacing the light diffusion layer coating liquid 26 of Example 22 with the light diffusion layer coating liquid 31 mentioned below, and coating and drying were so carried out that a coating amount of the solid content was 32.0 $g/m^2$, a transmission type screen of Example 27 was prepared. Incidentally, the porosity measured in the same manner as in Example 22 was 55%, and the specific surface area of the light diffusion fine particles dispersed in a single particle form per unit area of the screen was 3.1 $m^2/m^2$.

<Light Diffusion Layer Coating Liquid 31>
Alumina dispersion liquid (as alumina solid content): 150 parts
Polyvinyl alcohol: 50 parts (Saponification degree: 88%, average polymerization degree: 3500)

Boric acid: 2.5 parts

Nonionic surfactant: 0.3 part (Polyoxyethylene alkyl ether)

Unspecified shape light diffusion fine particles: 150 parts (P-78A average secondary particle diameter: 6.0 μm, specific surface area: 360 m$^2$/g, refractive index: 1.45)

Light diffusion fine particles dispersed in a single particle form: 6.6 parts (Optobeads 500S)

The liquid was so adjusted with water that the total concentration of the solid contents became 10%.

Example 28

In the same manner as in Example 22 except for replacing the light diffusion layer coating liquid 26 of Example 22 with the light diffusion layer coating liquid 32 mentioned below, a transmission type screen of Example 28 was prepared. Incidentally, the porosity measured in the same manner as in Example 22 was 55%, and the specific surface area of the light diffusion fine particles dispersed in a single particle form per unit area of the screen was 3.1 m$^2$/m$^2$.

<Light Diffusion Layer Coating Liquid 32>

Silica dispersion liquid 1 (as silica solid content): 150 parts

Polyvinyl alcohol: 100 parts (Saponification degree: 88%, average polymerization degree: 3500)

Boric acid: 16 parts

Nonionic surfactant: 0.3 part (Polyoxyethylene alkyl ether)

Unspecified shape light diffusion fine particles: 150 parts (P-78A average secondary particle diameter: 6.0 μm, specific surface area: 360 m$^2$/g, refractive index: 1.45)

Light diffusion fine particles dispersed in a single particle form: 53 parts (Optobeads 2000M average primary particle diameter 2.0 μm, true specific gravity: 2.2, refractive index: 1.65)

The liquid was so adjusted with water that the total concentration of the solid contents became 10%.

Example 29

In the same manner as in Example 22 except for replacing the light diffusion layer coating liquid 26 of Example 22 with the light diffusion layer coating liquid 33 mentioned below, a transmission type screen of Example 29 was prepared. Incidentally, the porosity measured in the same manner as in Example 22 was 55%, and the specific surface area of the light diffusion fine particles dispersed in a single particle form per unit area of the screen was 3.1 m$^2$/m$^2$.

<Light Diffusion Layer Coating Liquid 33>

Silica dispersion liquid 1 (as silica solid content): 150 parts

Polyvinyl alcohol: 100 parts (Saponification degree: 88%, average polymerization degree: 3500)

Boric acid: 16 parts

Nonionic surfactant: 0.3 part (Polyoxyethylene alkyl ether)

Unspecified shape light diffusion fine particles: 150 parts (P-78A, average secondary particle diameter: 6.0 μm, specific surface area: 360 m$^2$/g, refractive index: 1.45)

Light diffusion fine particles dispersed in a single particle form: 25 parts (SSX-101, average primary particle diameter: 1.0 μm, true specific gravity: 1.19, refractive index: 1.49)

The liquid was so adjusted with water that the total concentration of the solid contents became 10%.

Example 30

In the same manner as in Example 22 except for replacing the light diffusion layer coating liquid 26 of Example 22 with the light diffusion layer coating liquid 34 mentioned below, a transmission type screen of Example 30 was prepared. Incidentally, the porosity measured in the same manner as in Example 22 was 55%, and the specific surface area of the light diffusion fine particles dispersed in a single particle form per unit area of the screen was 3.1 m$^2$/m$^2$.

<Light Diffusion Layer Coating Liquid 34>

Silica dispersion liquid 1 (as silica solid content): 150 parts

Polyvinyl alcohol: 100 parts (Saponification degree: 88%, average polymerization degree: 3500)

Boric acid: 16 parts

Nonionic surfactant: 0.3 part (Polyoxyethylene alkyl ether)

Unspecified shape light diffusion fine particles: 150 parts (P-705 available from Mizusawa Industrial Chemicals, Ltd., amorphous synthetic silica (gel method silica), average secondary particle diameter: 3.0 μm, specific surface area: 300 m$^2$/g, refractive index: 1.45)

Light diffusion fine particles dispersed in a single particle form: 12 parts (Optobeads 500S)

The liquid was so adjusted with water that the total concentration of the solid contents became 10%.

Example 31

In the same manner as in Example 22 except for replacing the light diffusion layer coating liquid 26 of Example 22 with the light diffusion layer coating liquid 35 mentioned below, a transmission type screen of Example 31 was prepared. Incidentally, the porosity measured in the same manner as in Example 22 was 55%, and the specific surface area of the light diffusion fine particles dispersed in a single particle form per unit area of the screen was 3.1 m$^2$/m$^2$.

<Light Diffusion Layer Coating Liquid 35>

Silica dispersion liquid 1 (as silica solid content): 150 parts

Polyvinyl alcohol: 100 parts (Saponification degree: 88%, average polymerization degree: 3500)

Boric acid: 16 parts

Nonionic surfactant: 0.3 part (Polyoxyethylene alkyl ether)

Unspecified shape light diffusion fine particles: 150 parts (P-78F available from Mizusawa Industrial Chemicals, Ltd., amorphous synthetic silica: (gel method silica), an average secondary particle diameter: 18.0 μm, specific surface area: 300 m$^2$/g, refractive index: 1.45)

Light diffusion fine particles dispersed in a single particle form: 12 parts (Optobeads 500S)

The liquid was so adjusted with water that the total concentration of the solid contents became 10%.

Example 32

In the same manner as in Example 22 except for replacing the light diffusion layer coating liquid 26 of Example 22 with the light diffusion layer coating liquid 36 mentioned below, a transmission type screen of Example 32 was prepared. Incidentally, the porosity measured in the same manner as in Example 22 was 52%, and the specific surface area of the light diffusion fine particles dispersed in a single particle form per unit area of the screen was 3.1 m²/m².

<Light Diffusion Layer Coating Liquid 36>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Light diffusion fine particles dispersed in an aggregated form in which the secondary particles are spherical: 150 parts
(SUNSPHERE H-121-ET available from Iwase Cosfa Co., Ltd., spherical porous silica particles, average secondary particle diameter: 12.0 μm, specific surface area: 601 m²/g, refractive index: 1.45)
Light diffusion fine particles dispersed in a single particle form: 12 parts
(Optobeads 500S)
The liquid was so adjusted with water that the total concentration of the solid contents became 10%.

Example 33

In the same manner as in Example 22 except for replacing the light diffusion layer coating liquid 26 of Example 22 with the light diffusion layer coating liquid 37 mentioned below, a transmission type screen of Example 33 was prepared. Incidentally, the porosity measured in the same manner as in Example 22 was 54%, and the specific surface area of the light diffusion fine particles dispersed in a single particle form per unit area of the screen was 3.1 m²/m².

<Light Diffusion Layer Coating Liquid 37>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Light diffusion fine particles dispersed in a single particle form: 7.7 parts
(Optobeads 500S)
The liquid was so adjusted with water that the total concentration of the solid contents became 10%.

Example 34

In the same manner as in Example 22 except for replacing the light diffusion layer coating liquid 26 of Example 22 with the light diffusion layer coating liquid 38 mentioned below, a transmission type screen of Example 34 was prepared. Incidentally, the porosity measured in the same manner as in Example 22 was 55%, and the specific surface area of the light diffusion fine particles dispersed in a single particle form per unit area of the screen was 3.1 m²/m².

<Light Diffusion Layer Coating Liquid 38>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-78A, average secondary particle diameter: 6.0 μm, specific surface area: 360 m²/g, refractive index: 1.45)
Light diffusion fine particles dispersed in a single particle form: 103 parts
(Optobeads 3500M, average primary particle diameter: 3.5 μm, true specific gravity: 2.2, refractive index: 1.65)
The liquid was so adjusted with water that the total concentration of the solid contents became 10%.

Example 35

In the same manner as in Example 22 except for replacing the light diffusion layer coating liquid 26 of Example 22 with the light diffusion layer coating liquid 39 mentioned below, a transmission type screen of Example 35 was prepared. Incidentally, the porosity measured in the same manner as in Example 22 was 55%.

<Light Diffusion Layer Coating Liquid 39>
Silica dispersion liquid 1 (as silica solid content): 150 parts
Polyvinyl alcohol: 100 parts
(Saponification degree: 88%, average polymerization degree: 3500)
Boric acid: 16 parts
Nonionic surfactant: 0.3 part
(Polyoxyethylene alkyl ether)
Unspecified shape light diffusion fine particles: 150 parts
(P-78A, average secondary particle diameter: 6.0 μm, specific surface area: 360 m²/g, refractive index: 1.45)
The liquid was so adjusted with water that the total concentration of the solid contents became 10%.

Comparative Example 5

In the same manner as in Example 22 except for replacing the light diffusion layer coating liquid 26 of Example 22 with the light diffusion layer coating liquid 40 mentioned below, and coating and drying were so carried out that a coating amount of the solid content was 13.0 g/m², a transmission type screen of Comparative example 5 was prepared. Incidentally, the porosity measured in the same manner as in Example 22 was 3%, and the specific surface area of the light diffusion fine particles dispersed in a single particle form per unit area of the screen was 3.1 m²/m².

<Light Diffusion Layer Coating Liquid>
Alkali treated gelatin: 100 parts
Nonionic surfactant: 0.3 part
(Polyoxyethylene alkyl ether)
Unspecified shape light diffusion fine particles: 150 parts
(P-78A, average secondary particle diameter: 6.0 μm, specific surface area: 360 m²/g, refractive index: 1.45)
Light diffusion fine particles dispersed in a single particle form: 12 parts
(Optobeads 500S)
The liquid was so adjusted with water that the total concentration of the solid contents became 10%.

With regard to the transmission type screens obtained in Examples 22 to 35, and Comparative example 5, the total light transmittance and the haze value in conformity with JIS-K7105 were measured, and the total light transmittances all exceeded 50%, and the haze values all exceeded 70%. Thereafter, an opposite surface of the transmission type screen on the light diffusion layer was laminated on a transparent acryl plate, an image with an aspect ratio of 4:3 and a size of 60 inches was projected from the light diffusion layer side by using an ultra short throw projector (IPSiO PJ WX4130 manufactured by Ricoh Company, Ltd.) and observed from the opposite side of the projector to evaluate luminance, luminance unevenness and hot spot phenomenon based on the following criteria. Incidentally, at the time of evaluating luminance and luminance unevenness, evaluation was carried out 2 m away from the screen, and observing at a height of 33 cm from the bottom edge at the center of the screen in the width direction, and at the time of evaluating hot spot phenomenon, evaluation was carried out by observing from the position at which a lens of the projector, the image of the screen and the observing position were on a straight line. These results are shown in Table 3.

<Luminance>
4: Luminance of whole screen is very high.
3: Luminance of whole screen is high.
2: It is usable, but luminance of whole screen seems slightly low.
1: Luminance of whole screen is very low and it is impossible to use.

<Luminance Unevenness>
4: No luminance unevenness on whole screen and it is very good.
3: Substantially no luminance unevenness on whole screen and it is good.
2: It is usable, but luminance unevenness on whole screen can be recognized a little, which is a level of concern.
1: Luminance unevenness exists on whole screen and it is impossible to use.

<Hot Spot>
4: Hot spot phenomenon cannot be recognized and very good.
3: Hot spot phenomenon can be recognized by thorough observation.
2: Hot spot phenomenon can be recognized.
1: Hot spot phenomenon can be clearly recognized as it is dazzling.

Incidentally, even when the evaluation is 2 or 1, if the image is not watched from the position at which a lens of the projector, the image of the screen and the observing position are on a straight line, the screen can be used.

TABLE 3

|  | Luminance | Luminance unevenness | Hot spot |
|---|---|---|---|
| Example 22 | 4 | 4 | 4 |
| Example 23 | 4 | 4 | 3 |
| Example 24 | 3 | 4 | 4 |
| Example 25 | 4 | 3 | 4 |
| Example 26 | 4 | 4 | 4 |
| Example 27 | 4 | 4 | 4 |
| Example 28 | 3 | 4 | 4 |
| Example 29 | 4 | 3 | 4 |
| Example 30 | 4 | 4 | 2 |
| Example 31 | 2 | 4 | 4 |
| Example 32 | 4 | 4 | 2 |
| Example 33 | 4 | 4 | 1 |
| Example 34 | 2 | 4 | 4 |
| Example 35 | 3 | 2 | 3 |
| Comparative example 5 | 3 | 1 | 3 |

From the results shown in Table 3, it can be understood that, according to the present invention, a transmission type screen in which luminance of an image projected by a projector is high, luminance unevenness does not appear, and further hot spot phenomenon is improved can be obtained.

EXPLANATION OF REFERENCE NUMERALS

1: Transmission type screen
2: Light diffusion fine particles
3: Light diffusion layer
4: Light transmissive support
5: Adhesive layer
6: Separate substrate
7: Resin binder component
8: Xerogel

The invention claimed is:

1. A transmission type screen which comprising a light transmissive support and a light diffusion layer on at least one surface of the light transmissive support, wherein the light diffusion layer contains light diffusion fine particles and a xerogel matrix,
   the light diffusion fine particles being at least one member selected from the group consisting of particles dispersed in a single particle form and having an average primary particle diameter of 0.2 to 20.0 μm and particles dispersed in an aggregated form and having an average secondary particle diameter of 1.0 to 20.0 μm, and
   the xerogel matrix being mainly composed of inorganic fine particles and a resin binder, wherein the inorganic fine particles are particles dispersed in an aggregated form and having an average primary particle diameter of 18 nm or less and an average secondary particle diameter of 500 nm or less.

2. The transmission type screen according to claim 1, wherein the inorganic fine particles are at least one member selected from the group consisting of amorphous synthetic silica, alumina, and alumina hydrate.

3. The transmission type screen according to claim 2, wherein the light diffusion layer contains fine particles dispersed in a single particle form and fine particles dispersed in an aggregated form as the light diffusion fine particles,
   the fine particles dispersed in a single particle form have an average primary particle diameter of 2.75 μm or less,
   the fine particles dispersed in an aggregated form have an average secondary particle diameter of 3.5 to 15.0 μm, and a shape of the secondary particle is unspecified shape.

4. The transmission type screen according to claim 1, wherein an average primary particle diameter of the light diffusion fine particles is 2.75 μm or less.

5. The transmission type screen according to claim 4, wherein the fine particles dispersed in a single particle form are organic fine particles, and a shape of their primary particle is spherical.

6. The transmission type screen according to claim 1, wherein the fine particles dispersed in a single particle form are organic fine particles, and a shape of their primary particle is spherical.

7. The transmission type screen according to claim 1, wherein an average secondary particle diameter of the light diffusion fine particles is 3.5 to 15.0 μm.

8. The transmission type screen according to claim 7, wherein the fine particles dispersed in an aggregated form are amorphous synthetic silica.

9. The transmission type screen according to claim 1, wherein the fine particles dispersed in an aggregated form are amorphous synthetic silica.

10. The transmission type screen according to claim 1, wherein the light diffusion layer contains fine particles dispersed in a single particle form and fine particles dispersed in an aggregated form as the light diffusion fine particles,
    the fine particles dispersed in a single particle form have an average primary particle diameter of 2.75 μm or less,
    the fine particles dispersed in an aggregated form have an average secondary particle diameter of 3.5 to 15.0 μm, and a shape of the secondary particle is unspecified shape.

11. The transmission type screen according to claim 10, wherein an average secondary particle diameter of the fine particles dispersed in an aggregated form is 5.0 to 9.0 μm.

12. The transmission type screen according to claim 10, wherein the fine particles dispersed in a single particle form are organic fine particles, and the fine particles dispersed in an aggregated form are inorganic fine particles.

13. The transmission type screen according to claim 1, wherein a refractive index of the light diffusion fine particles is greater than 1.55.

* * * * *